United States Patent [19]
McIntosh

[11] 3,717,301
[45] Feb. 20, 1973

[54] VALVE CONSTRUCTION WITH MODULATING DIAPHRAGM CONSTRUCTION AND METHOD

[75] Inventor: Harold A. McIntosh, South Pasadena, Calif.

[73] Assignee: Robertshaw Controls Company, Richmond, Va.

[22] Filed: Aug. 26, 1970

[21] Appl. No.: 67,209

Related U.S. Application Data

[62] Division of Ser. No. 716,556, March 27, 1968, Pat. No. 3,550,901.

[52] U.S. Cl. ............ 236/12 A, 251/38, 236/80
[51] Int. Cl. .................................. G05d 23/13
[58] Field of Search ....... 236/12, 12 A, 75, 80, 1 EZ; 251/38

[56] References Cited

UNITED STATES PATENTS

| | | | |
|---|---|---|---|
| 3,207,435 | 9/1965 | ERickson et al. | 236/12 A |
| 3,489,347 | 1/1970 | Egli | 236/12 |
| 2,401,144 | 5/1946 | Dube | 62/127 |
| 2,449,766 | 9/1948 | Brown | 236/12 A |
| 2,830,766 | 4/1958 | Algino | 236/12 A |
| 2,844,320 | 7/1958 | Cate | 236/80 X |
| 2,917,268 | 12/1959 | Soderberg et al. | 251/35 |
| 3,023,996 | 3/1962 | Robertson | 251/38 X |
| 3,469,590 | 9/1969 | Barker | 137/1 |

FOREIGN PATENTS OR APPLICATIONS

| | | | |
|---|---|---|---|
| 937,537 | 9/1963 | Great Britain | 236/12 A |

Primary Examiner—William E. Wayner
Attorney—Auzville Jackson, Jr., Robert L. Marben and Candor, Candor & Tassone

[57] ABSTRACT

This application discloses a valve construction having a hot water inlet connected with a mixing chamber, a cold water inlet connected with the mixing chamber, and a water discharge outlet from said mixing chamber. One or more valve seats are provided in one or more of the inlets. One or more diaphragms are provided in modulating relationship with one or more of said valve seats. Each diaphragm construction includes a pilot passageway and bleed opening and an adjustable pilot in modulating relationship with the valve seat. A thermostat construction is responsive to the mixed water temperature of the mixing chamber and has adjusting means to adjust one or more pilots in modulating relationship to the water passageways in the one or more diaphragms. The thermostat construction may adjust the hot and/or cold water pilot to introduce a proper amount of hot and/or cold water into the mixing chamber. The pilot or pilots may be encased in a cavity wall construction which provides a cavity on one side of the diaphragm. One or more levers are provided with inner ends in the cavities and with sealing outward connections, so that their outer ends may be actuated by the thermostat construction to provide the modulating water control for the hot and/or cold water. This invention may also be used with other fluids than hot and cold water. Such fluids may be liquid or gaseous as desired.

8 Claims, 18 Drawing Figures

INVENTOR.
HAROLD A. McINTOSH

Cauden, Cauden & Tassone
HIS ATTORNEYS

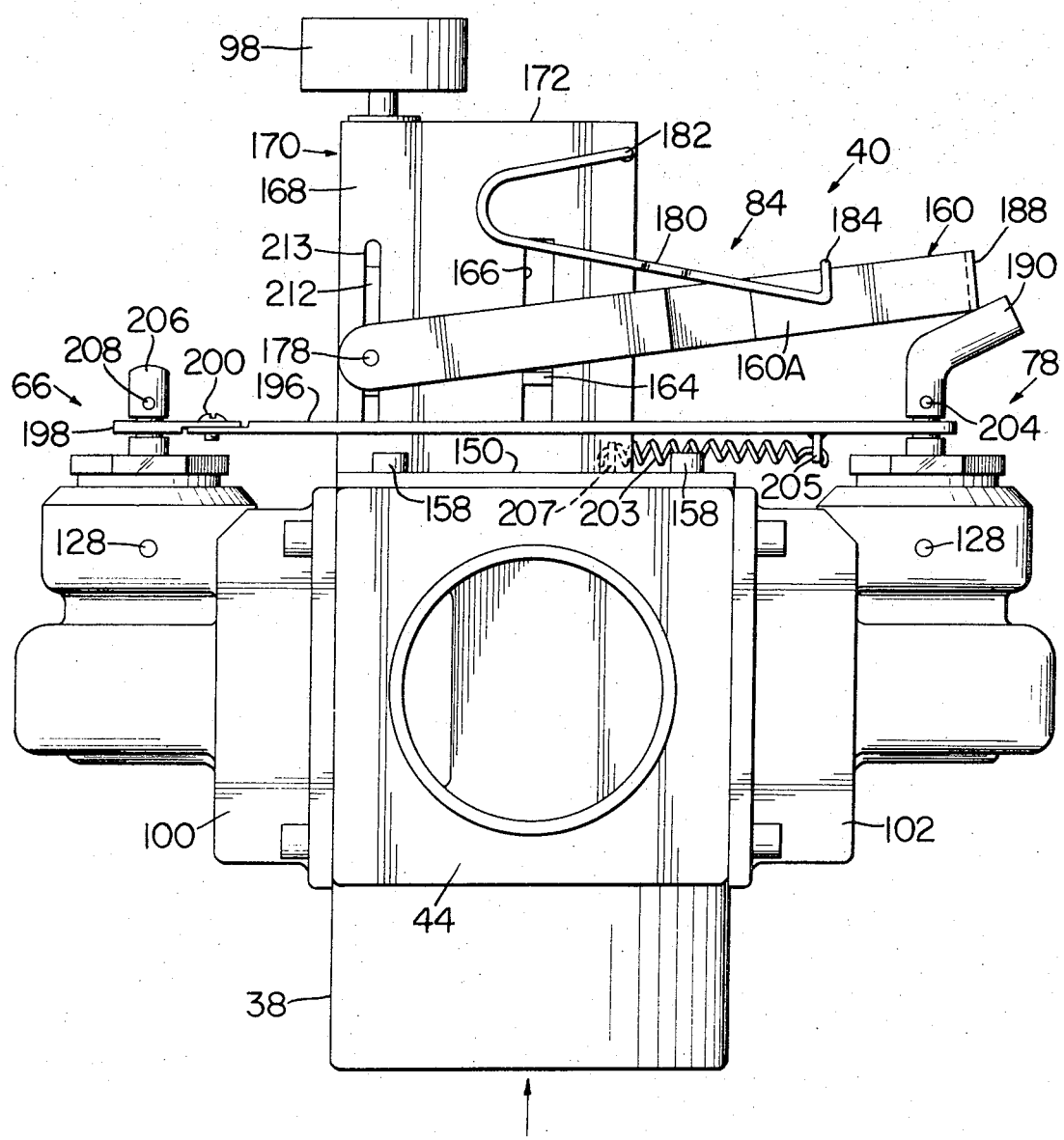

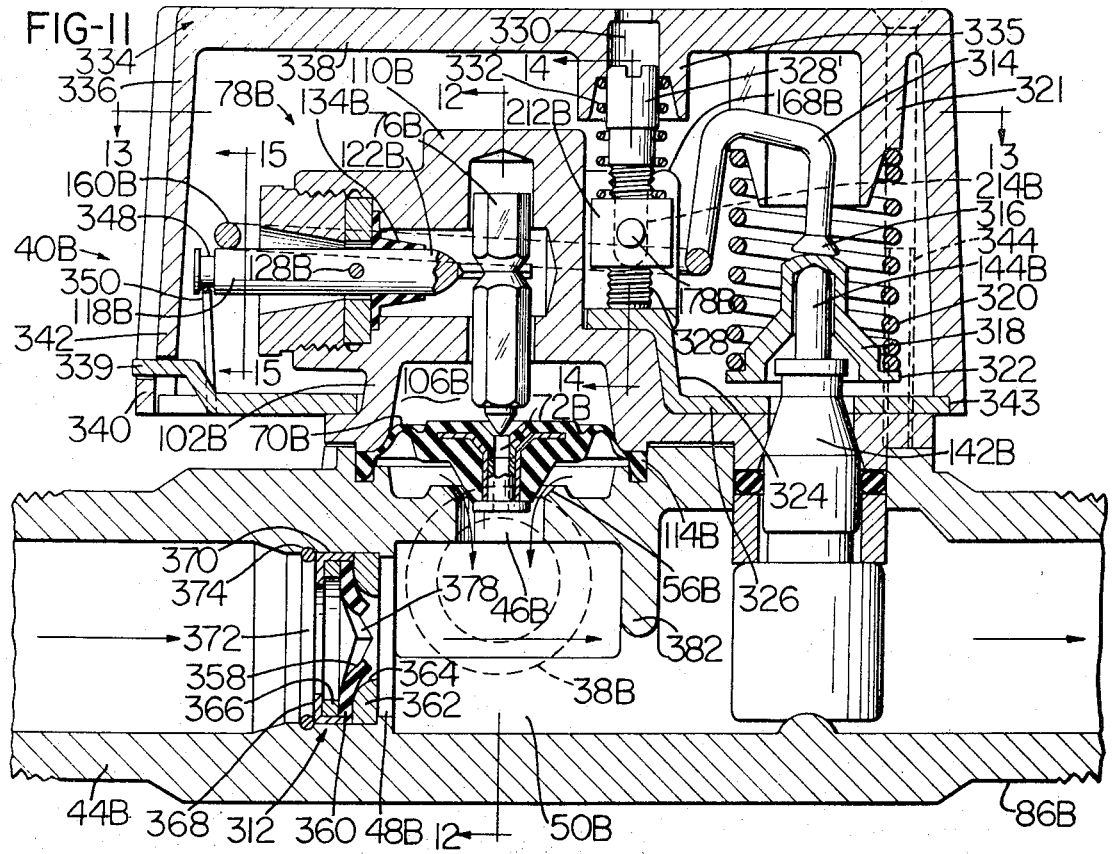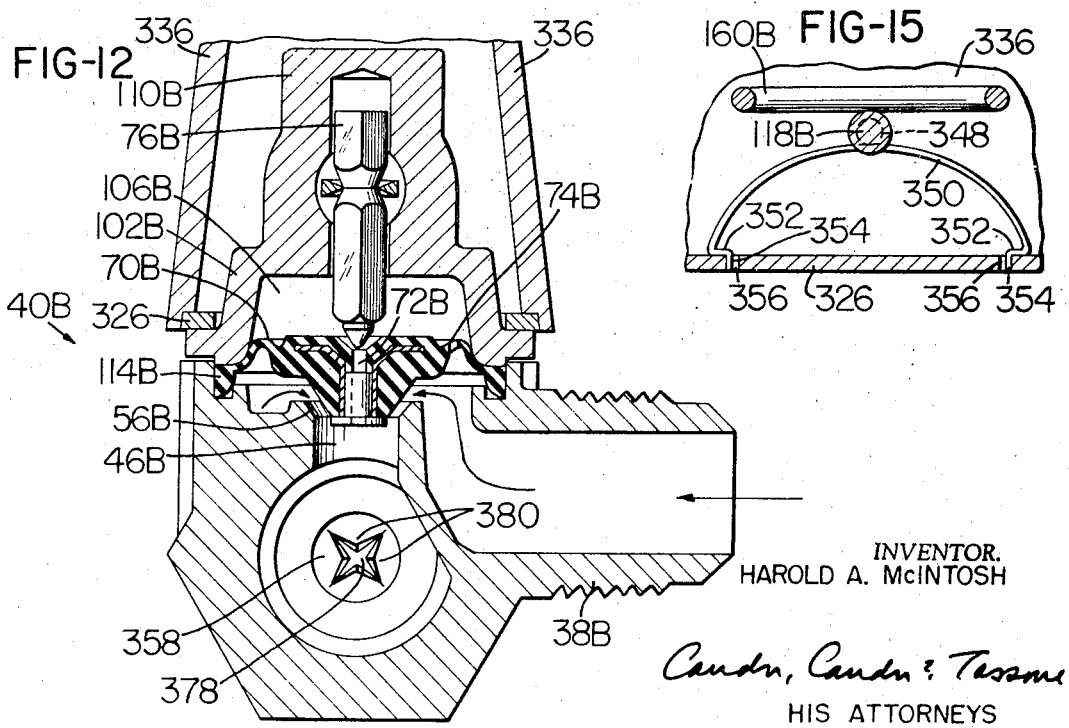

INVENTOR.
HAROLD A. McINTOSH

HIS ATTORNEYS

VALVE CONSTRUCTION WITH MODULATING DIAPHRAGM CONSTRUCTION AND METHOD

This application is a divisional patent application of its copending parent application, Ser. No. 716,556, filed Mar. 27, 1968, now U.S. Pat. No. 3,550,901, and is assigned to the same assignee to whom the parent application is assigned.

One of the features of this invention includes a valve construction with a modulating diaphragm construction and method.

Another feature of this invention includes a modulating diaphragm construction, with a modulating pilot construction.

Another feature of this invention includes a valve construction with a diaphragm construction having a pilot passageway and a bleed opening, and a pilot construction adjustable held at various modulating positions with respect to said pilot passageway.

Another feature of this invention includes one or more of such diaphragm constructions connected to one or more individual inlets for fluids to be mixed, the diaphragm construction or constructions discharging into a mixing chamber and from there to a fluid outlet.

Another feature includes a thermostatic construction responsive to the mixed fluid temperature and modulating one or more of the pilot constructions.

Other features of this invention are apparent from this description, the appended claimed subject matter, and/or the drawings, in which:

FIG. 5 is an end view taken along the line 5—5 of FIG. 2.

FIG. 7 is a detail view taken along the line 7—7 of FIG. 1.

FIG. 8 is a cross section taken along the line 8—8 of FIG. 7.

FIG. 9 is a diagrammatic view taken along the line 9—c 9 of FIG. 1.

FIG. 10 is a diagrammatic view along the line 10—10 of FIG. 1.

FIG. 11 is a diagrammatic vertical cross section showing a single diaphragm controlled by the thermostatic element.

FIG. 12 is a cross section along line 12—12 of FIG. 11.

FIG. 15 is a cross section along the line 15—15 of FIG. 11.

Figure 1:
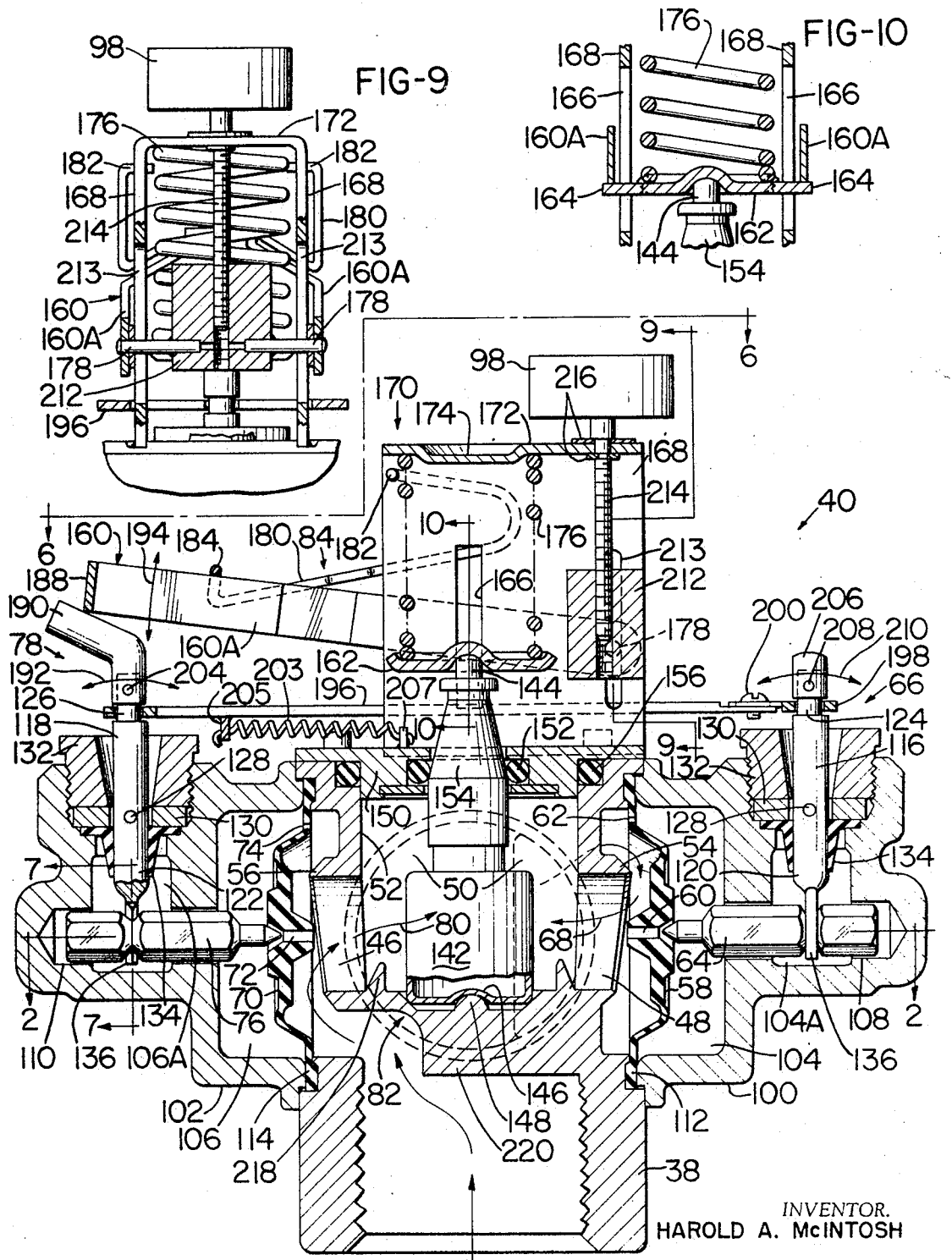
FIG. 1 is a generally vertical diagrammatic cross section of a valve construction embodying this invention, and having two diaphragms controlled by a single thermostatic element.

Certain words may be used in this application, which indicate direction, relative position, and the like. Such words are used for the sake of clearness and brevity. However, such words are used in connection with the views in the drawings, and in actual use, the article or parts thereof so described may be changed in position to have entirely different direction, relative position, and the like. Examples of such words are "vertical", "horizontal", "upper", and "lower", etc.

This invention will be specifically described in connection with hot and cold water systems, in which the hot and cold water may have substantially the same pressure, or different pressures. Also such hot and cold water may have substantially unvaried water temperatures or varied temperatures at the inlets of the valve construction.

This invention may also be used with other fluids than hot and cold water, and such fluids may be either in liquid or gaseous phase.

Figure 4:
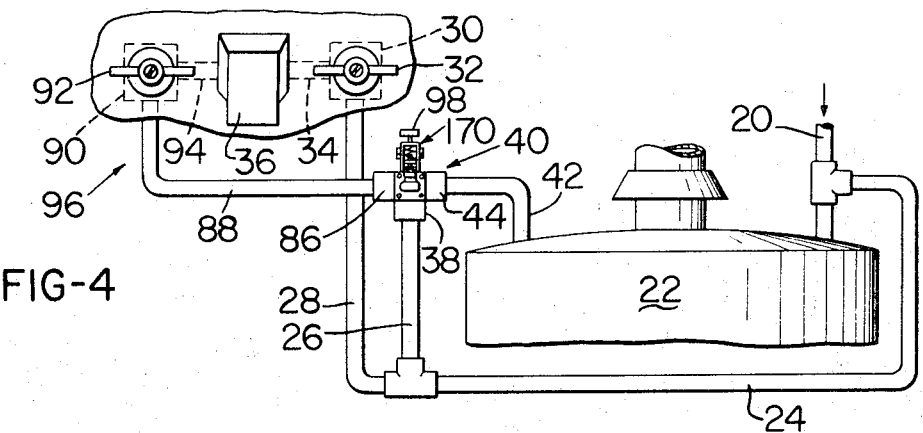
FIG. 4 is a diagrammatic view of a cold and hot water system including the valve construction of FIGS. 1–10.
Figure 16:
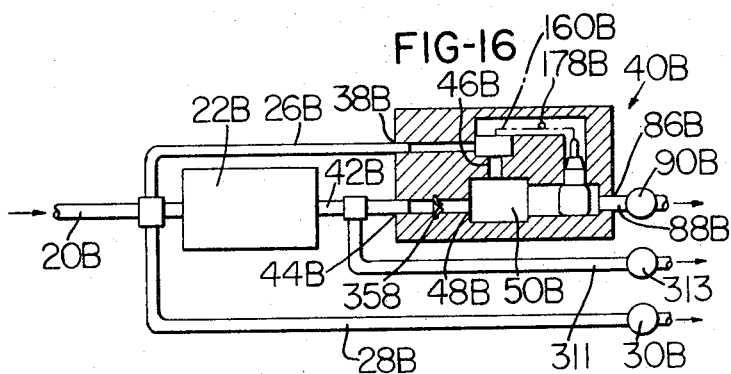
FIG. 16 is a diagrammatic view of a cold and hot water system including the valve construction of FIGS. 11–18.
Figure 17:
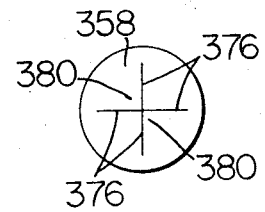
FIG. 17 is a side view of the resilient variable orifice means adjacent the hot water inlet of FIG. 11.
Figure 14:
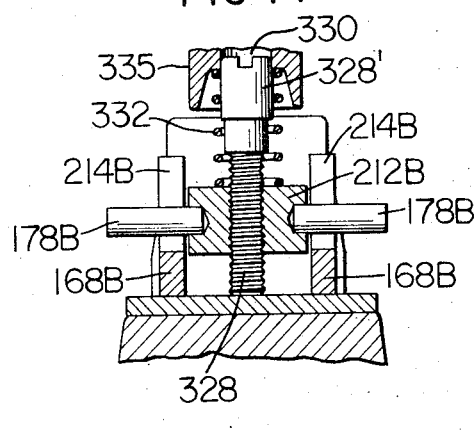
FIG. 14 is a cross section along the line 14—14 of FIG. 11.
Figure 18:
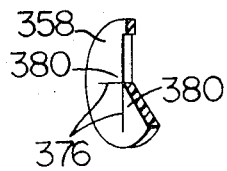
FIG. 18 is a combined cross section and perspective view of the variable orifice means of FIG. 17.

This invention may be used in connection with first and second fluid systems, respectively such as hot and cold water systems, such as are shown in FIGS. 4 and 16. For example, the systems may be such as used in residences, apartments, office buildings, commercial buildings and the like.

In FIG. 4, a common cold water supply, not shown, may be connected to a cold water branch 20 which branch may be connected to a hot water heater 22, which may be thermostatically controlled, if desired, to provide substantially constant temperature hot water. Another cold water branch 24 may be connected to cold water branches 26 and 28, with the branch 28 being connected to a cold water discharge valve 30, which may be controlled by a knob or lever 32. The valve 30 may be connected by connection 34 to a common faucet 36.

The cold water branch 26 may be connected to the cold water inlet or inlet wall 38 of the valve construction 40 of FIGS. 1–10.

The hot water heater 22 may have a hot water outlet pipe 42 which may be connected to the hot water inlet, or inlet wall 44 of the valve construction 40.

Figure 2:
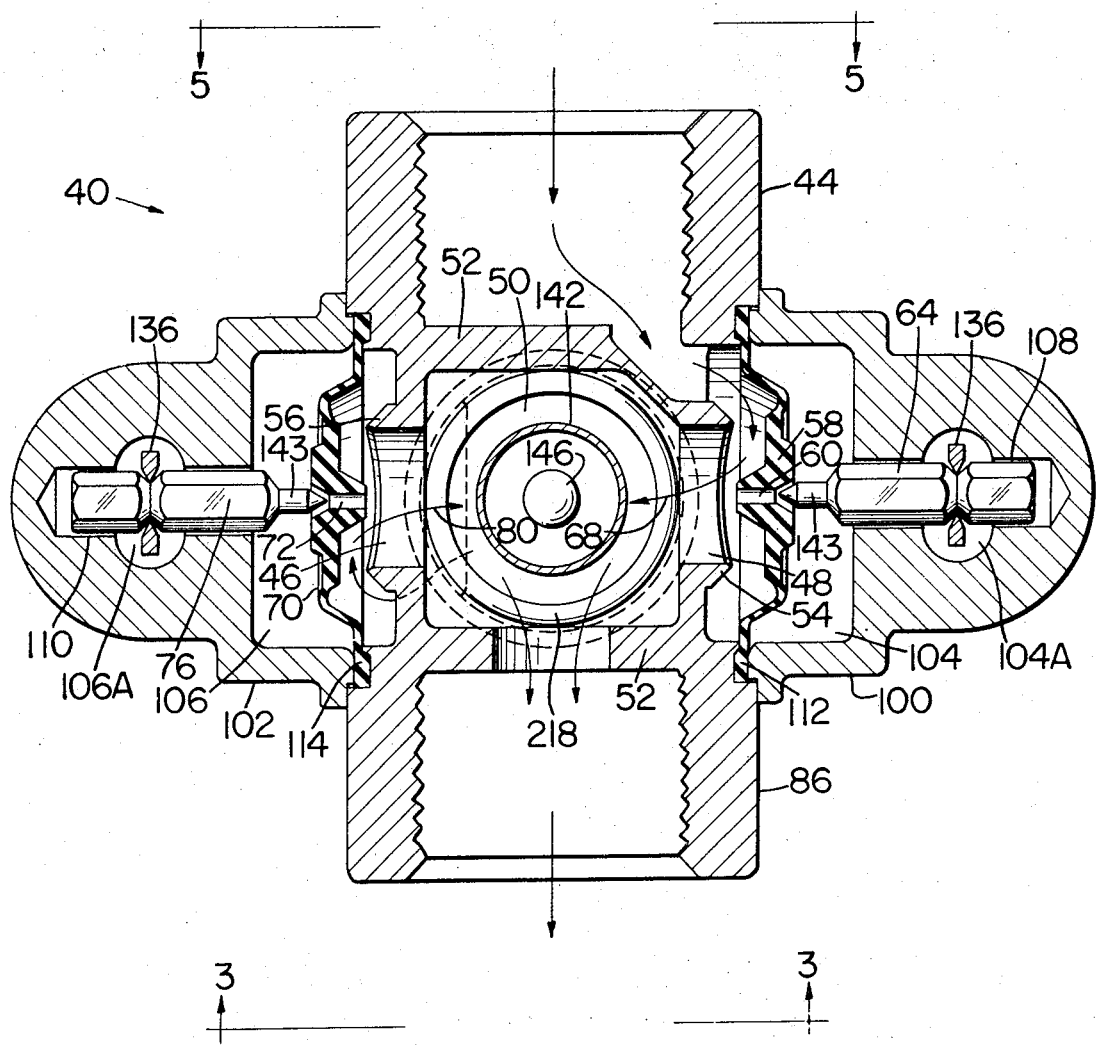
FIG. 2 is a diagrammatic cross section taken along the line 2—2 of FIG. 1.

In FIGS. 1 and 2, the cold water inlet wall 38, and the hot water inlet wall 44 may have, respectively, a cold water inlet connection 46 and a hot water inlet connection 48 with a mixing chamber 50 which is formed by the mixing chamber wall 52. The hot and cold water may be mixed in mixing chamber 50 under thermostatic control to be described and such mixed water may be discharged from said mixing chamber 50 through outlet 86.

In the water system of FIG. 16, the common cold water supply of the building or the like may be connected to a cold water branch 20B which may be connected to a hot water heater 22B, which may be thermostatically controlled to provide substantially constant temperature hot water. The cold water branch 20B may be connected to another cold water branch 26B which is connected to the cold water inlet or inlet wall 38B of the valve construction 40B of FIGS. 11–18.

The hot water heater 22B may have a hot water outlet pipe 42B which may be connected to the hot water inlet wall 44B of the valve construction 40B.

In FIGS. 11–18, the cold water inlet wall 38B and the hot water inlet wall 44B may have a cold water inlet connection 46B and a hot water inlet connection 48B with a mixing chamber 50B. The hot and cold water may be mixed in the mixing chamber 50B under thermostatic control to be described and such mixed water may be discharged from said mixing chamber 50B through mixed water outlet 86B.

One of the differences between the water system and valve construction of FIGS. 1–10 and the water system of FIGS. 11–18 is that the thermostatic control of FIGS. 1–10 may directly control by diaphragm action the flow of both hot water and cold water into the mixing chamber 50, whereas the thermostatic control of FIGS. 11–18 may directly control by diaphragm action only the flow of one of the fluids, such as the cold water, at the cold water inlet 46B into the mixing chamber 50B.

With this difference in mind, the specific disclosure of FIGS. 1–10 will first be described, and then the specific disclosure of FIGS. 11–18 will thereafter be described.

Referring again to FIGS. 1–10, a hot water valve seat 54 is provided in the hot water inlet connection 48. Also a cold water valve seat 56 is provided in the cold water connection 46.

A hot water pilot diaphragm 58 is provided in modulating relationship with the hot water valve seat 54. The diaphragm 58 may have a hot water pilot passageway 60 and a hot water bleed opening 62.

An adjustable hot water pilot 64 may be provided in modulating relationship with the hot water pilot passageway 60. A hot water pilot adjusting means 66 may be provided for adjusting the hot water pilot 64 in modulating relationship with said hot water pilot passageway 60. The construction is such that the valve seat 54, the diaphragm 58, with its passageway 60 and bleed opening 62, and the pilot 64 cooperate to provide a modulated hot water stream 68 from the hot water inlet 44 into the mixing chamber 50. Ordinarily there is no sudden stopping and starting of the hot water stream 68 into the mixing chamber 50.

A cold water pilot diaphragm 70 is provided in modulating relationship with the cold water valve seat 56. The diaphragm 70 may have a cold water pilot passageway 72 and a cold water bleed opening 74.

An adjustable cold water pilot 76 is provided in modulating relationship with said cold water passageway 72. A cold water pilot adjusting means 78 is provided for adjusting the cold water pilot 76. The cold water pilot adjusting means 78 adjusts the cold water pilot 76 in modulating relationship with the cold water pilot passageway 72. The construction is such that there is a modulated cold water flow 80 from said cold water inlet 38 to the mixing chamber 50.

The valve construction 40 may include a thermostat construction 82 responsive to the mixed water temperature of mixed water produced in the mixing chamber 50. The thermostat construction 82 cooperates with thermostat construction responsive adjusting means 84. Such thermostat construction adjusting means 84 adjusts the hot water pilot adjusting means 66 and the cold water pilot adjusting means 78.

The thermostat construction adjusting means 84 adjusts the hot water pilot adjusting means 66 to increase the amount of hot water introduced into the mixing chamber 50 while adjusting the cold water pilot adjusting means 78 to decrease the amount of cold water introduced into the mixing chamber 50, and vice versa. That is, conversely, the thermostat construction adjusting means 84 may adjust the cold water pilot adjusting means 78 to increase the amount of cold water introduced into the mixing chamber 50 while adjusting the hot water pilot adjusting means 66 to decrease the amount of hot water introduced into the mixing chamber 50.

The mixing chamber wall 52, the hot water inlet wall 44, the cold water inlet wall 38 and a water discharge wall 86, or discharge outlet 86 may be homogeneously bonded together as a unitary valve construction. Such homogeneous bonding may be of the type produced by casting these parts.

Also the hot water inlet connection 44, the hot water valve seat 54, the cold water inlet connection 38, and the cold water valve seat 56 may be wall constructions homogeneously bonded together with said mixing chamber wall 52, said hot water inlet wall 44, said cold water inlet wall 38, and said water discharge wall 86, also to form part of the unitary valve construction.

The water discharge wall or outlet 86, of the valve construction 40, may be connected to an all hot water or a mixed hot and cold water pipe 88, FIG. 4, which may be connected to an all hot water, or a mixed hot and cold water valve 90 which may be gradually opened and closed by the knob or handle 92 of the valve 90. The valve 90 may be connected by connection 94 with the faucet 36.

The valve construction 40 may thus be connected to any water discharge or consuming device 96, FIG. 4, which may consume or discharge all cold water by opening only the cold water valve 30. The user may have all hot water, or mixed hot and cold water by opening only the hot or mixed water valve 90, while adjusting the handle 98 to cause the valve construction 40 to discharge either all hot water into the pipe 88 through the outlet 86, or mixed hot and cold water of a selected ratio or temperature, which is determined by the adjustment of handle 98, of the valve construction 40, as more fully elsewhere described.

A hot water pilot cavity wall 100 and a cold water cavity wall 102 may be provided which form respectively hot and cold water cavities 104 and 106. Each of the cavity walls 100 and 102 may have pilot bearing means 108 and 110 respectively. The respective cavities 104 and 106 are connected respectively to the hot water inlet wall 44 and to the cold water inlet wall 38 through the respective pilot passageways 60 and 72 and the respective bleed openings 62 and 74. The respective pilot cavity walls 100 and 102 engage and are sealed to one side of the respective diaphragms 58 and 70, and engage such diaphragms at the diaphragm rims 112 and 114.

Hot water and cold water actuating levers 116 and 118 are provided respectively with inner ends 120 and 122 of each lever in the respective pilot cavities 104 and 106.

The levers 116 and 118 have respective outer ends 124 and 126. The levers 116 and 118 are fulcrumed at fulcrums 128 which are carried by washers 130 which are held down by externally threaded nuts 132. The levers 116 and 118 are hermetically sealed by the flexible seals 134, which tightly surround the inner ends of the levers, and have their rims sealed by the washers 130. The lower ends 120 and 122 of the levers have forks 136 with relatively sharp inner edges 138, FIGS. 7 and 8, which engage grooves 140 in the plungers 64 and 76. The plungers 64 and 76 may be hexagonal in cross section and slidingly engage the circular bearing means 108 and 110, so that the fluid pressure and cavity action of the cavities 104 and 106 extend into the sub-cavities 104A and 106A adjacent the rods. The construction is such that the pressures within the cavities 104, 106, 104A and 106A are equalized so that there is substantially no endwise thrust produced on the plungers 64 and 76, and so that there is substantially no rightward or leftward pressure action at the outer ends of the rods 116 and 118.

The plungers 64 and 76 have pointed plunger extensions 143 which cooperate with the funnel-shaped ends of the passageways 60 and 72, to produce a modulating action wherein the water passing into the valve seats 54 and 56 is in the nature of a steady stream, instead of the usual sudden on and off closing action which is produced by the usual pilot diaphragms and pilot plungers. The valve seats 54 and 56 are slanted, as shown in FIG. 1, so that stability is imparted to the diaphragm constructions particularly when the diaphragms reach fully closed positions or nearly closed positions. The slanting construction of the seats 54 and 56 eliminates the tendency to hunt at such extreme settings of the plungers.

The thermostat construction 82 may be of any desired construction. For example, it may be a well known "power pill" 142 which contains fluid or semi-fluid material expanding and contracting in response to the temperature of the surrounding medium. Such power pill has a plunger 144 which moves outwardly and inwardly from the end of the power pill. Such power pill is sold by the Fulton-Sylphon Division of Robert Shaw Controls Company of Knoxville, Tennessee. It is commonly used in automobile cooling radiators or in other parts of the automobile cooling system so that its piston 144 moves inwardly and outwardly at water temperatures of the type herein contemplated.

Preferably, the thermostat or pill 82 is mounted in the central valve or mixing chamber 50 in a suspended manner. The dimple 146 of the bottom wall of the casing of the pill 82 rests on a small spherical boss 148 projecting inwardly from the bottom of the chamber 50. The chamber cover 150 contains an O-ring seal 152 which contacts the tapered neck 154 of the pill 82. The neck 154 has a suitable hole construction to receive the plunger 144 and allow it to reciprocate inwardly and outwardly in response to changes in water mix temperatures. The chamber cover 150 also has another O-ring 156 which forms a seal along the rim of the mixing chamber wall 52, the cover being secured on top of the mixing chamber wall 52 by screws 158.

Movement of the plunger 144 is transmitted to an operating lever 160 by means of a disc 162 which has ears 164 which extend outwardly from opposite vertical slots 166 in the side walls 168 of the spring casing 170. The side walls 168 support the top wall 172 which has a downward dimple 174 to hold the upper end of the compression spring 176. The spring 176 is held between the top wall 172 and the disc 162, to allow the disc 162 to rise and fall in response to temperature changes in the pill 82.

Figure 6:
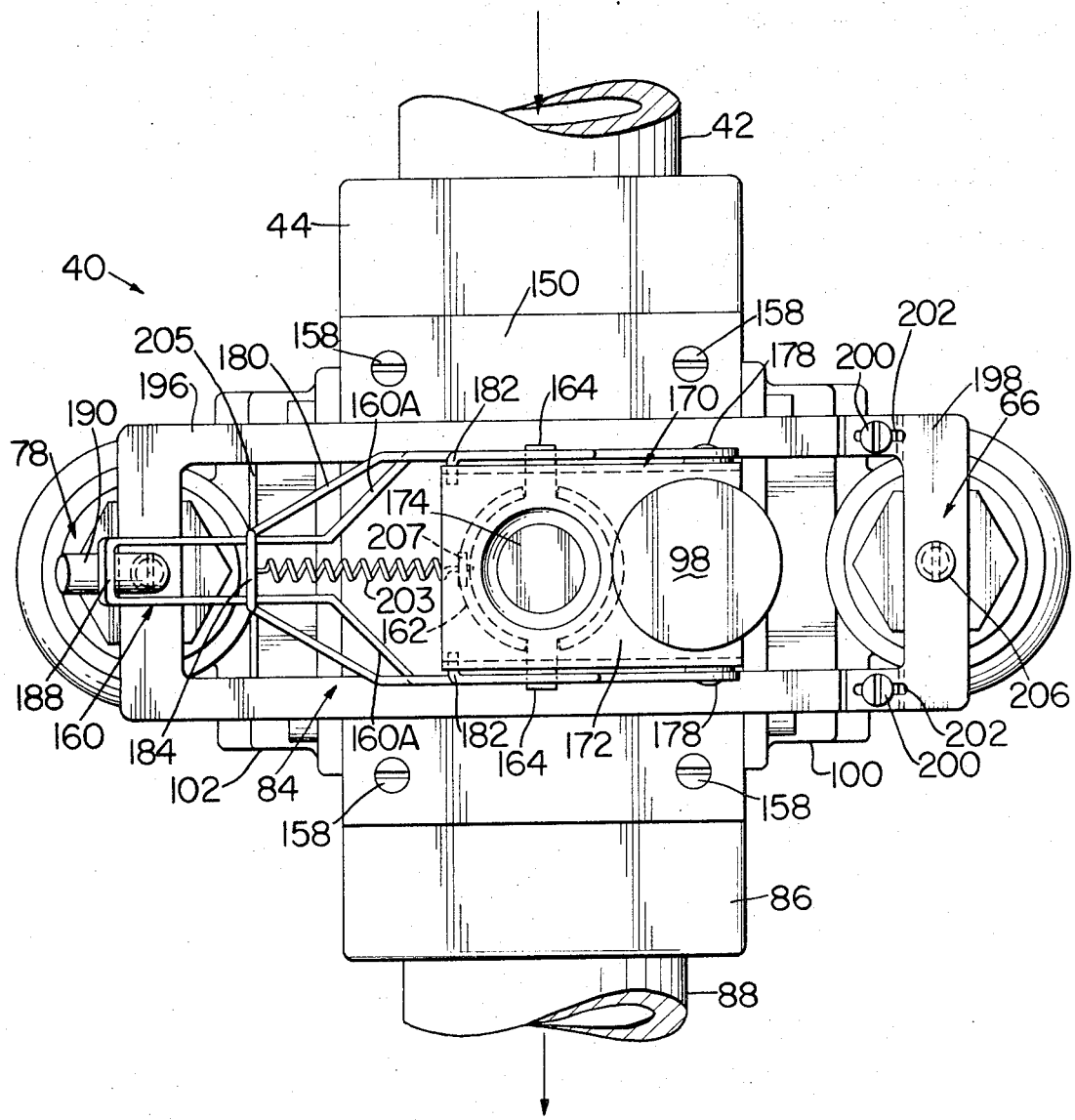
FIG. 6 is a top view, taken along the line 6—6 of FIG. 1.

The lever 160 is a U-shaped lever with two side arms 160A, FIG. 6, which extend rightwardly, FIG. 6, and are secured to fulcrum pins 178 which are vertically adjustable in the side walls 168.

Figure 3:
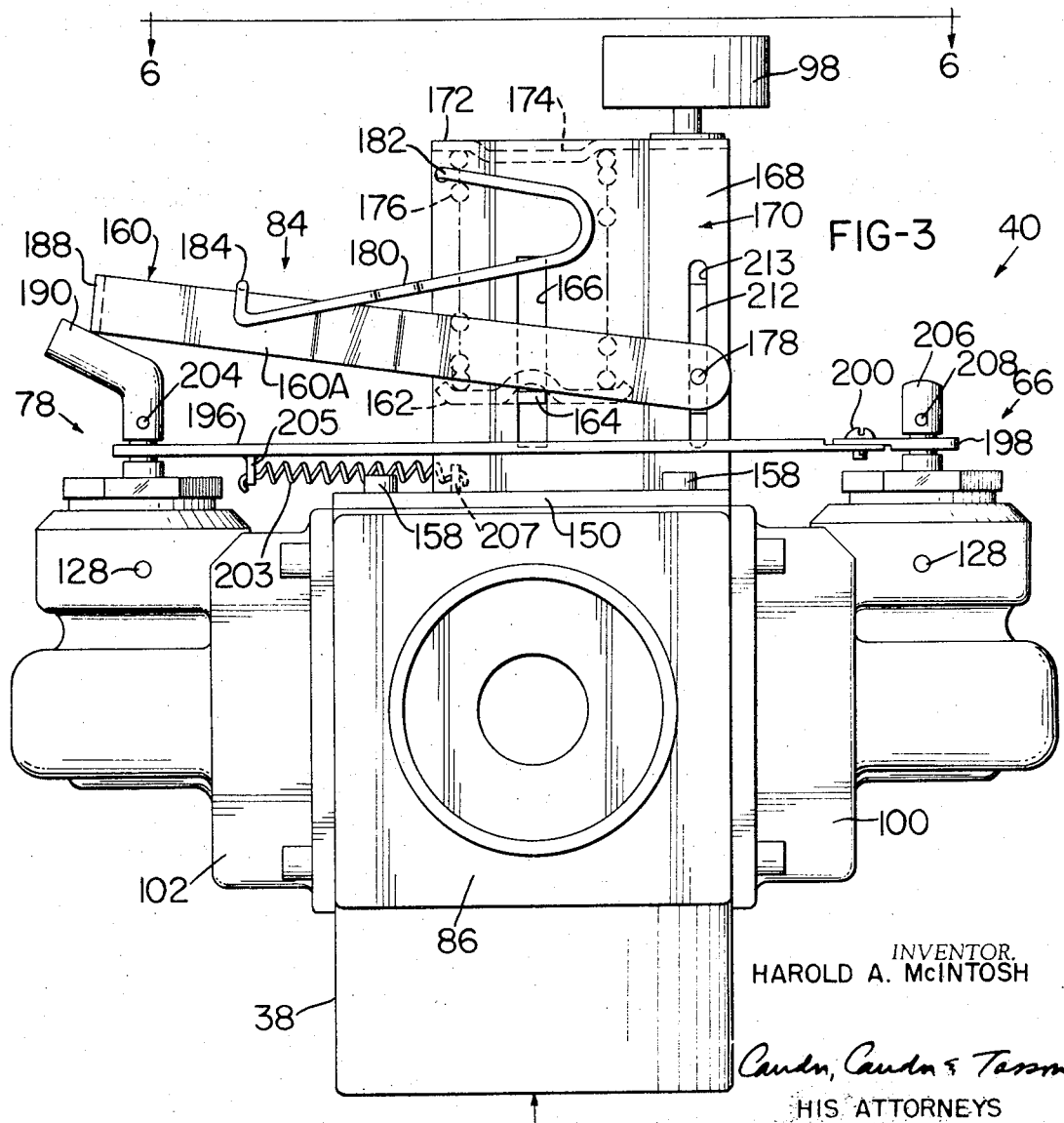
FIG. 3 is an end view taken substantially on the line 3—3 of FIG. 2.

A U-shaped wire spring 180 has its ends 182 hooked into openings in the side walls 168 of the spring casing and the spring 180 zigzags as shown in FIGS. 1, 3 and 5 so that the base 184 straddles the side members 160A of the lever 160 and pushes the lever 160 downwardly. The end 188 of the lever 160 engages a bent cam 190, which is secured to the end 126 of the lever 118 so that upward and downward movement of the end 188 against the cam 190 causes the lever 118 to rock back and forth as indicated by the arrow 192, while the lever 160 rocks about the arrow 194. The rocking movements 192 and 194 cause rightward and leftward movement of the upper end 126 of the cold water lever 118.

A motion transmitting rectangular frame 196, 198 is made up of U-shaped members 196 and 198, which are secured together by screws 200 in slots 202. The frame is rightwardly biased by tension spring 203, the ends of which are hooked into a bar 205 on member 196 and a lug 207 on cover 150. The lever 118 is secured in an opening in U-shaped member 196 and is held in place thereon by the cam member 190 which is fastened by a pin 204 to lever 118. The U-shaped member 198 has an opening through which the end 124 of the lever 116 passes and is held thereon by means of a cap 206 which is held on the lever 116 by a pin 208.

The rectangular frame member 196, 198 causes the lever 116 to rock back and forth along the double arrow 210 whenever the lever 118 rocks back and forth along the double arrow 192.

The fulcrums 178 of the arms 160A of lever 160 pass through slots 213 in the sides 168 of the spring casing 170. The fulcrum pins 178 are secured, by soldering or the like, into a block 212 into which an adjusting screw 214 extends and is threaded therein. The screw 214 is rotationally free, but longitudinally fixed by the washer constructions 216 on the cover 172 of the casing 170. The adjusting knob 98 is secured to the upper end of the screw 214, so that the screw may be turned by the knob 98 to adjust the fulcrum end of lever 60.

Any type of baffle construction 218 may be placed in the mixing chamber 50 to cause the hot water and cold water to mix thoroughly together in the mixing chamber. The thermostat or power pill 142 may be placed where it will be responsive to the mixed water rather than being responsive to the valve casing walls and the like. In view of this, the power pill is supported on an isolated platform 220, which carries the spherical boss 148 and holds the power pill 142 at a place where it is responsive to the mixed water. In the embodiment shown, the pill 142 is in a position where the waters entering the mixing chamber 50 swirl about the power pill in a manner to impart an average temperature thereto. If desired, however, the power pill may be moved to any other suitable location, where it will be in the path of the mixed water produced in the mixing chamber 50.

In the operation of this invention when using hot and cold water, such cold water is introduced into the valve construction 40 at the cold water inlet 38, hot water is introduced into the hot water inlet 44. These waters may be mixed in a mixing chamber 50 and may be discharged through a water discharge wall or outlet 86. Hot water from the heater 22 is generally of a fixed temperature, since the heater 22 is thermostatically controlled. If the user desires cold water only, he opens the cold water valve 30 and cold water is discharged through the connection 34 to the faucet 36. If the user desires substantially all hot water only he adjusts the knob 98, to adjust the lever constructions and the like in combination with the thermostat 82, so that the cold water diaphragm 70 is placed substantially against the cold water valve seat 56 to close such seat 56 so that only hot water can enter through the hot water valve seat 54 and be discharged through the outlet wall 86, pipe 88, hot water valve 90, connection 94, and faucet 36. The user can regulate the volume of both the hot water and the cold water or the mixed water by the degree of opening of the valves 30 and 90.

The diaphragm constructions 58 and 70 are modulating diaphragms in which, under ordinary conditions, the diaphragms are spaced somewhat from their respective valve seats 54 and 56, and the plunger points 143 are spaced from the diaphragms so that a modulated and continuous hot water stream 68 and cold water stream 80 may be discharged into the mixing chamber 50.

This modulating action of the diaphragms is obtained by providing pilots 64 and 76 with adjusting mechanisms which may hold the plungers spaced from the diaphragms, so that a continuous modulating action takes place, instead of a sudden on-off action which is the usual operation of pilot diaphragms wherein the pilots engage the diaphragms and cause them to close completely.

While the invention has been disclosed in connection with hot and cold water as the fluid mediums to be mixed and controlled, it is to be understood that this invention may be applied to any other fluids, either liquid or gaseous, to control the flow of such fluids.

It is believed unnecessary to describe this invention again in detail in connection with fluids in general, rather than in connection with hot and cold water, since such description would be merely a repetitious and voluminous description.

In general it may be considered that wherever hot water is described in connection with the water systems, a "first fluid" may be considered as representative of any one fluid that might be controlled in the same manner as hot water. Wherever the words "cold water" are used, it may be considered that a "second fluid" may be considered to be introduced into the valve construction where cold water is introduced.

FIGS. 11-18 show a construction in which only one diaphragm means 70B is used to control one of the fluids being discharged into the mixing chamber means 50B, such as the second fluid or cold water. The first fluid or hot water is not controlled by a diaphragm means and may be discharged into the mixing chamber means 50B with sufficient restriction to maintain a fluid pressure in the mixing chamber 50B of a character such that the second fluid or cold water can flow into such mixing chamber 50B. For example, one type of restriction for the first fluid or hot water may be an orifice means 312, which may be a variable orifice means to be described.

Where possible, the parts of FIGS. 11-18 which correspond fairly closely with similar or corresponding parts of FIGS. 1-10, will be identified with reference numerals having the suffix B, and when so identified, such parts may have corresponding and somewhat similar operation as the parts of FIGS. 1-10 which are identified with similar reference numerals without the suffix B. Where the context and structure permits, such parts that are identified with reference numerals having such suffix B are to be presumed to have a sufficient similarity to the corresponding parts of FIGS. 1-10, so that the previous descriptions for FIGS. 1-10 also apply to corresponding parts of FIGS. 11-18.

FIGS. 11-18 show a construction in which a first fluid, or hot water, inlet means or connection 48B discharges hot water into the mixing chamber means 50B, and a second fluid, or cold water, inlet means or connection 46B discharges cold water into the mixing chamber means 50B of the valve construction 40B. A mixed fluid, or mixed hot and cold water, discharge means 88B is connected to the mixed fluid outlet means 86B from the mixing chamber means 50B. A first fluid, or hot water, discharge means or conduit 311 may be connected to the hot water heater outlet 42B. A cold water discharge means or conduit 28B may be connected to cold water branch 20B. The mixed water discharge means 88B may be provided with a mixed water discharge valve 90B. The cold water discharge means 28B may have discharge valve 30B, and the hot water discharge conduit 311 may have a hot water discharge valve 313.

The first fluid, or hot water, may be supplied from the hot water heater 22B to the hot water inlet or inlet wall 44B through the heater outlet 42B. A resilient variable orifice means 312 is placed adjacent the hot water inlet means or connection 48B, to regulate the flow of the first fluid, or hot water, from water heater outlet 42B into the mixing chamber means 50B.

A second fluid or cold water valve seat 56B is provided for said second fluid or cold water connection 46B. A fluid pilot diaphragm means 70B is provided in modulating relationship with the fluid valve seat 56B. The diaphragm means 70B may have a fluid pilot passageway 72B and a bleed opening 74B. An adjustable fluid pilot or pilot means 76B may be in modulating relationship with the pilot passageway 72B.

A fluid pilot adjusting means 78B may be provided for adjusting the fluid pilot 76B in modulating relationship with the fluid pilot passageway 72B.

A thermostat construction or means or pill 142B is provided which is responsive to the mixed fluid temperature in the mixing chamber 50B.

The hot water diaphragm 58 of FIGS. 1 and 2 has been omitted and has been replaced by the variable orifice means 312 of FIGS. 11-18.

The mixing chamber means 50B, the hot water inlet means 48B, the cold water inlet means or construction 46B and the mixed fluid discharge means 86B may include walls which are homogeneously bonded together substantially in the same manner as the corresponding parts of FIGS. 1-10. Also the first fluid or hot water connection 44B, the second fluid or cold water connection 38B, and the fluid valve seat 56B are wall constructions which are homogeneously bonded with the mixing chamber means 50B, the first fluid or hot water inlet means 48B, the second fluid or cold water inlet means 38B, and the mixed fluid discharge means 86B substantially in the same manner as in FIGS. 1-10.

A fluid or cold water cavity means 106B may be formed by a fluid or cold water cavity wall 102B adjacent said second fluid or cold water inlet means 46B. The cavity wall 102B may have pilot bearing means 110B for said pilot 76B. The pilot cavity 106B is connected to said second fluid or cold water inlet means 46B through the pilot passageway 72B and the bleed opening 74B.

The cavity means 106B is sealed to one side of the diaphragm means 70B, at the rim 114B.

A pilot actuating lever 118B is provided with an end 122B in the pilot subcavity 106AB and connected to said fluid pilot 76B, in the same manner as in FIGS. 1-10, and is sealingly extending out of said cavity wall 102B and is sealed by seal 134B.

The thermostat construction 142B may have a thermostat plunger 144B moving in and out of said thermostat construction 142B in response to the mixed fluid temperature. Actuating lever adjusting means 160B is actuated by said plunger 144B to adjust the pilot actuating lever 118B and said pilot 76B.

Figure 13:
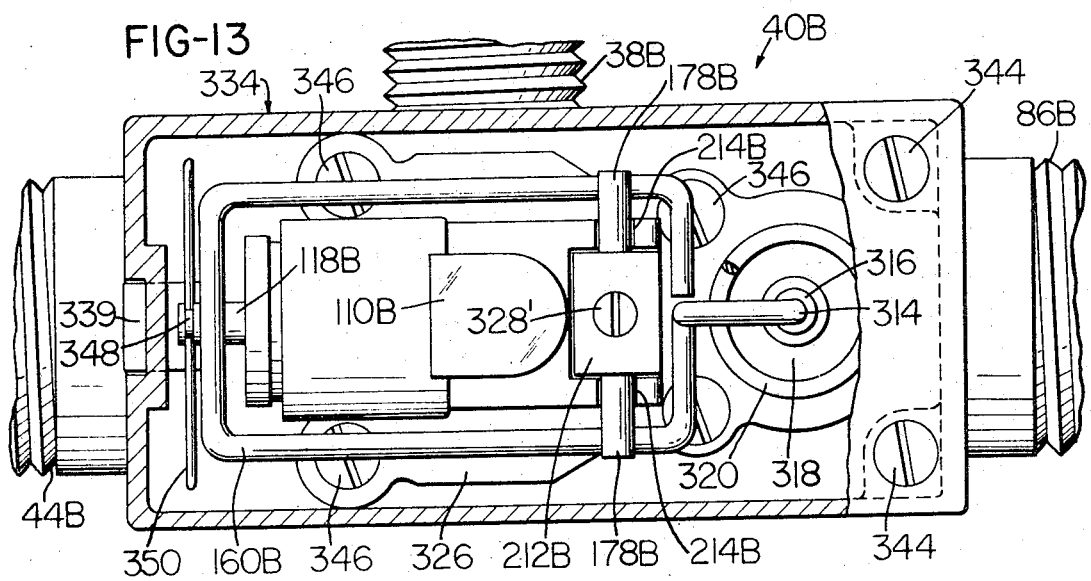
FIG. 13 is a horizontal cross section along line 13—13 of FIG. 11.

The actuating lever adjusting means 160 B may be made in the form of a looped heavy wire lever, as shown in FIGS. 11, 13 and 15, with one end 314 of the wire curled upwardly and downwardly and terminating in an end cap 316. This cap 116 may engage a spring retainer inverted cup 318 which receives one end of a power compression spring 320 which engages the rim 322 of the cup 318. The cup 318 receives the thermostat plunger 144B. The upper end of spring 320 engages a part 321 of the cover 334 to be described.

The wire lever 160B is upwardly fulcrumed under the fulcruming pins 178B which are vertically adjustable in the side walls 168B of an upward extension 324 of a retainer plate 326 which may be welded or bolted on top of the cavity wall 102B.

The fulcrum pins 178B are carried by a vertically adjustable block 212B positioned between the side walls 168B. The pins 178B ride in slots 214B in the side walls 168B.

The adjustable block 212B and fulcrum pins 178B are adjusted up and down by the adjusting screw 328 which is threaded in the block 212B and is provided with the slotted adjusting screw head 328' which can be turned by a screw driver through opening 330. A suitable adjusting knob, not shown, and extending out opening 330 may be substituted for the screw head 328'. A compression spring 332 presses down on the block 212B and holds the lower end of screw 328 against the retainer plate 326. The upper end of spring 332 presses against the cover 334 inside the flange 335.

An inverted cup-shaped cover 334 has side walls 336 extending down from the "bottom" 338 of the cover. The cover 334 is secured to the retainer plate 326 by any suitable means. For example, the retainer plate 326 may have a raised tongue 339 which is hooked between the offset portions 340 and 342 of an opening in the side wall 336 of the cover. The other parts of the side walls of the cover 334 have off-set or stepped engagement 343 with the edge of the retainer plate 326. The cover may be secured against the retainer plate 326 by the countersunk flat headed cover screws 344. Similar flat headed body screws 346 may secure the retainer plate 326 and the cavity wall 102B to the main body of the mixing chamber 50B. Suitable O-rings and similar sealing rims, etc., are provided to provide proper fluid flow and prevent leakage.

The left end of lever 118B may be provided with a spring receiving groove 348 which receives the upwardly biased arch shaped compression return spring 350 which may have arresting end shoulders 352 which rest on retainer plate 326, FIG. 15, and arresting spring ends 354 which are received and arrested in openings 356. The spring 350 pushes upwardly on the left end of lever 118B and indirectly on the left end of lever 160B. The thermostat plunger 144B indirectly pushes up on the right end 316 of lever 160B. The combined action of spring 350 and thermostat plunger 144B pushes the lever 160B upwardly against the fulcrum pins 178B and indirectly upwardly on adjustable block 212B and the compression spring 332. This rocks the left end of lever 118B about the fulcrum 128B to modulate the pilot 76B in response to change in the temperature of the mixed fluid or hot and cold water in the mixing chamber 50B. The amount of cold water passing valve seat 56B is increased when the water mixture temperature has increased and is decreased as the mixture temperature has decreased. This maintains the general mixture temperature substantially constant, depending on the adjustment of the fulcrum pins 178B by rotation of the screw head or knob 328.

The variable orifice means 312 adjacent the hot water inlet 48B may include a resilient rubber disc 358 which may be held at the rim 360 of the disc 358 by the backing member 362 which may be provided with a rounded backing wall 364. The rubber disc 358 may be held in place on the other side by an outwardly biased split C-ring 366 which is expanded in a suitable groove formed by the flange 368 formed at the left side of the variable orifice forming ring 370 which also includes the backing member 362 at its right edge. The ring 370 may be held adjacent the inwardly flanged hot water inlet means 48B by another outwardly biased split C-ring 372 which is expanded into groove 374.

The resilient member or disc 358 may have a plurality of radial slits 376 which permit the resilient member 358 to yield to the downstream flow of hot water to provide a variable orifice 378 as illustrated in FIG. 12. The tongues 380 between the radial slits 376 bulge rightwardly in FIG. 11 so that the orifice 378 enlarges as the mixed water discharge valve 90B is opened wider, to decrease the resistance to flow of hot water into the mixing chamber 50B as compared to the resistance when the discharge valve 90B is not as widely opened.

The advantage of the resilient variable orifice member 358 is that it tends to neutralize the variation of the hot water and cold water ratio which occurs when the flow volume is varied at the discharge means or discharge valve 90B. The variable orifice 378 causes the desired ratio of hot and cold water to be maintained much more closely than is possible with the use of an invariable orifice similar to an enlarged flange 48B which also may be used without the variable orifice means 355.

The variable orifice 358 very materially reduces the mix temperature change as the volume at discharge valve 90B is varied, as compared by a fixed orifice in the place of the variable orifice. The disc 380 may be made of any suitable rubberlike material and may be, for example, 0.875 inches outside diameter. The radial slits 376 may have an outside diameter of 0.625 inches. The disc may be 0.063 inches thick. However, these dimensions may be varied with the size of the valve constructions, pressures involved, etc.

In a mixing valve of this type, a restriction 358 is desirable in the hot water inlet 48B to drop the pressure in the mixing chamber 50A so that the diaphragm modulating valve 70B will have sufficient pressure differential to open, to admit cold water when required for mixing. When a fixed orifice is used in the hot water inlet 48B, suitably sized for normal mix flows, the mix temperature increases materially when the mix flow is decreased, as by partial closing of the downstream point of use faucet valve 90B. The rise of the mix temperature under these conditions is due to the appreciable increase in mix chamber pressure which results in a disproportionate decrease in cold water intake through the diaphragm type modulating valve 70B.

Use of a variable orifice of the type disclosed herein in the hot water inlet 48B acts to provide a relatively more constant differential across the modulating diaphragm valve 70B under varying flow rates of mix water than can be obtained with a fixed orifice. When the variable orifice is used, the orifice size increases for higher flow rates and decreases for lower flow rates. Thus, under lower flow rate conditions, as the variable orifice reduces in size, the mix chamber pressure does not increase to the same degree as when a fixed orifice is used. This acts to provide the diaphragm type modulating valve 70B with a relatively higher pressure differential, allowing a more consistent proportion of cold water intake at lower flow rates, so that mix temperatures at lower flows do not rise to the same degree as when a fixed orifice is used.

The valve construction 40B of FIGS. 11–18 has a tubular mixing chamber means 50B, a first fluid inlet means 48B with a first fluid inlet connection 44B directed into and aligned with said tubular mixing chamber means 50B. Also a second fluid inlet means 46B with a second fluid inlet connection directed into and perpendicular to said tubular mixing means. A mixed fluid discharge means 86B with a mixed fluid outlet connecting means 88B out of and aligned with the tubular mixing chamber means 50B, a diaphragm control construction 70B, etc., is connected to and controls the flow of the second fluid into the tubular mixing chamber 50B, and a regulating construction or restricting means 312 to induce flow of the second fluid into the mixing chamber means 50B.

The thermostat construction 142B extends perpendicularly into the tubular mixing chamber means 50B adjacent the mixing baffle 382 to be responsive to the mixed fluids and has the adjusting lever construction 160B parallel to and outside the mixing chamber 50B and has a diaphragm pilot 76B perpendicular to said tubular mixing chamber and cooperating with the diaphragm construction 72B, etc. to control the flow of second fluid into the mixing chamber in response to mixed fluid temperatures.

The adjusting lever construction 160B includes the relatively heavy wire construction adjustably fulcrumed at 178B intermediate its ends and rocked at one of its ends 316 by the thermostat construction 142B. The other end of the adjusting lever 160B rocks on end of the pilot controlling lever 118B which has its other end connected to the pilot 76B.

The arch shaped spring 350 engages and actuates said other end of the actuating lever 160B.

It is thus to be seen that a useful valve construction and method have been provided.

While the form of the invention now preferred has been disclosed, as required by the statutes, other forms may be used, all coming within the scope of the claimed subject matter which follows.

What is claimed is:

1. In combination, a valve construction having a mixing chamber means, a first fluid inlet means with a first fluid inlet connection into said mixing chamber means, a second fluid inlet means with a second fluid inlet connection into said mixing chamber means, a fluid discharge means with a fluid outlet connection from said mixing chamber means, a fluid valve seat in said second fluid inlet connection, a fluid pilot diaphragm in modulating relationship with said fluid valve seat and having a fluid pilot passageway and a fluid bleed opening, an adjustable fluid pilot in modulating relationship with said fluid pilot passageway, and fluid pilot adjusting means for adjusting said fluid pilot in modulating relationship with said fluid pilot passageway whereby said fluid pilot is adapted to be adjusted to a plurality of positions so that a plurality of different fluid flow rates can be provided through said valve seat to said mixing chamber means, a thermostat construction responsive to mixed fluid temperature of mixed fluid produced in said mixing chamber means, said thermostat construction comprising a piston and cylinder thermostat that extends completely across the medial portion of said mixing chamber means, and thermostat construction responsive adjusting means controlled by said thermostat construction and adjusting said fluid pilot adjusting means.

2. In combination, a valve construction having a mixing chamber means, a first fluid inlet means with a first fluid inlet connection into said mixing chamber means, a second fluid inlet means with a second fluid inlet connection into said mixing chamber means, a fluid discharge means with a fluid outlet connection from said mixing chamber means, a fluid valve seat in said second fluid inlet connection, a fluid pilot diaphragm in modulating relationship with said fluid valve seat and having a fluid pilot passageway and a fluid bleed opening, an adjustable fluid pilot in modulating relationship with said fluid pilot passageway, and fluid pilot adjusting means for adjusting said fluid pilot in modulating relationship with said fluid pilot passageway whereby said fluid pilot is adapted to be adjusted to a plurality of positions so that a plurality of different fluid flow rates can be provided through said valve seat to said mixing chamber means, a thermostat construction responsive to mixed fluid temperature of mixed fluid produced in said mixing chamber means, said thermostat construction comprising a piston and cylinder thermostat that extends completely across the medial portion of said mixing chamber means, and thermostat construction responsive adjusting means controlled by said thermostat construction and adjusting said pilot adjusting lever.

3. In combination, a valve construction having a mixing chamber means, a first fluid inlet means with a first fluid inlet connection into said mixing chamber means, a second fluid inlet means with a second fluid inlet connection into said mixing chamber means, a fluid discharge means with a fluid outlet connection from said mixing chamber means, a fluid valve seat in said second fluid inlet connection, a fluid pilot diaphragm in modulating relationship with said fluid valve seat and having a fluid pilot passageway and a fluid bleed opening, an adjustable fluid pilot in modulating relationship with said fluid pilot passageway, and fluid pilot adjusting means for adjusting said fluid pilot in modulating relationship with said fluid pilot passageway whereby said fluid pilot is adapted to be adjusted to a plurality of positions so that a plurality of different fluid flow rates can be provided through said valve seat to said mixing chamber means, a thermostat construction responsive to mixed fluid temperature produced in said mixing chamber means, said thermostat construction comprising a piston and cylinder thermostat that extends completely across the medial portion of said mixing chamber means, a thermostat plunger comprising said piston of said thermostat and moving in and out of said thermostat construction in response to mixed fluid temperature, and actuating lever adjusting means actuated by said plunger to adjust said pilot actuating lever and said fluid pilot.

4. A combination according to claim 3 in which an adjustable fulcrum is provided for said actuating lever.

5. In combination, a valve construction having a tubular mixing chamber means, a first fluid inlet means with a first fluid inlet connection into and aligned with said tubular mixing chamber means, a second fluid inlet means with a second fluid inlet connection into and perpendicular to said tubular mixing means, a mixed fluid discharge means with a mixed fluid outlet connecting means out of and aligned with said tubular mixing chamber means, a diaphragm control construction connected to and controlling the flow of said second fluid into said tubular mixing chamber, and a regulating construction adjacent to and regulating the flow of said first fluid into said mixing chamber means to induce flow of said second fluid into said mixing chamber means, a thermostat construction extending perpendicularly into said tubular mixing chamber, having an adjusting lever construction parallel to and outside said mixing chamber and having a diaphragm pilot perpendicular to said tubular mixing chamber and cooperating with said diaphragm construction to control the flow of second fluid into said mixing chamber in response to mixed fluid temperature whereby said pilot is adapted to be adjusted to a plurality of positions so that a plurality of different flow rates of said second fluid can be provided for said mixing chamber.

6. A combination according to claim 5 in which said adjusting lever construction includes a looped relatively heavy wire construction adjustably fulcrumed intermediate its ends, and rocked at one lever end by said thermostat construction.

7. A construction according to claim 6 in which the other end of said adjusting lever construction rocks one end of a pilot controlling lever which has its other end connected to said pilot.

8. A construction according to claim 7 in which an arch shaped return spring engages and actuates said other end of said actuating lever.

* * * * *